3,242,028
INSOLUBILIZED PROTEINACEOUS FILMS
Robert T. Hart, West Falmouth, Maine, assignor, by mesne assignments, to Oxford Paper Company
No Drawing. Filed Jan. 17, 1961, Ser. No. 83,137
17 Claims. (Cl. 156—336)

This invention relates to proteinaceous compositions and, more particularly, to water-resistant or insolubilized proteins in which ammonium zirconyl carbonate is employed as an insolubilizing agent. The invention includes the liquid proteinaceous compositions which when deposited on a suitable base and dried exhibit a high degree of water resistance as well as supported and unsupported films prepared therefrom.

The invention also includes method of preparing and using the protein compositions and articles of this invention as disclosed in more detail below.

The proteins which can be used according to this invention include animal and vegetable proteins as exemplified by but not limited to casein and soya protein. Casein and soya protein are the preferred proteins.

It is generally recognized that casein can be colloidally dispersed in water, particularly by the use of various alkaline reagents such as hydroxides and various salts of the alkali metals which give an alkaline reaction in aqueous solutions. In this colloidally dispersed state, casein has been used for many purposes including the impregnation of fibers, as in the sizing of papers, as adhesives and as pigment bonding agents in paints and in coatings for paper, paperboard and other base materials.

Unfortunately, casein when dry is not particularly water resistant. The casein will absorb water vapor from the atmosphere and will be even more readily attacked by liquid water resulting in the deterioration of its adhesive power. Therefore, much effort has been directed to the discovery of means for insolubilizing casein adhesives to circumvent the deleterious action of water.

Historically, these efforts have been exerted along two lines—specifically, the reaction of casein with formaldehyde or formaldehyde donors and the reaction of casein with bivalent and polyvalent metal ions.

It is well known that formaldehyde will react with the amino and imido groups of casein to form cross-linked structures of improved water resistance. This type of reaction is effected by a variety of techniques ranging from simple "gassing" of the wet casein adhesive with vapors of formaldehyde through the inclusion of hexamethylenetetramine, a complex of ammonia and formaldehyde, in the casein composition to the more sophisticated methods involving the inclusion of a wide variety of resinous formaldehyde donors. These range from the simplest molecular structure of its type, dimethylol urea, to complex urea-formaldehyde, melamine-formaldehyde and substituted hydantoin, in which not only does the formaldehyde donor segment of the molecule react in the above manner but in which the resin itself contributes its inherent water insolubility to the casein-resin reaction product. Each of the above-described methods possesses disadvantages peculiar to itself. In those cases where free formaldehyde is present, odor and lachrymatory effects constitute a severe problem. In those cases where resinous formaldehyde donors are employed, undesirable increases in viscosity of the composition often ensue depending on the particular resin used.

The insolubilization of casein by bivalent and polyvalent metal salts is also one that has received attention. It is theorized that in this type of reaction the carboxyl groups of the casein and the metal ions are predominantly involved forming the corresponding metal caseinates which are essentially insoluble in or insensitive to water. For example, those bivalent metal ions capable of forming complex amines with ammonia may be employed as casein insolubilizers. Such metals are exemplified by copper, nickel, cadmium, cobalt, and zinc. The degree of insolubilization obtained, however, is inferior to that attainable by the use of my invention.

In the case of polyvalent metal ions it is well known that aluminum ions will effectively insolubilize casein, and alum solutions have been used for this purpose. However, its use was limited to processes where the final product, already coated and still wet, was washed with a solution of aluminum ions. The aluminum ions could not be included in the casein solution prior to its application to a base because the casein would precipitate immediately rendering it useless. The same difficulty was encountered with other polyvalent metal ions.

It was not until the advent of my prior patent, No. 2,849,334, that a method was disclosed for the inclusion of basic inner complex chelate salts containing a polyvalent metal ion within an alkaline aqueous composition containing casein, that said metal ions could be included without causing premature precipitation of the casein.

As described in my prior patent, the preparation of these organic metallic chelate complexes involved a tedious preparative method wherein the polyvalent metal salts were first dissolved in water, to which solution there was then added a solution of an organic alpha hydroxy carboxylic acid, following which a solution of an alkali was added, either of the volatile, ammoniacal class or of the non-volatile Group I alkali metal class. The resultant solution containing the organically chelated polyvalent metal ion complex could then be added to the alkaline aqueous colloidal dispersion of protein without premature precipitation of the said protein.

Soya protein has also been used in the same manner as casein and has been found to be objectionable for the same reasons described above. Although the above discussion of the prior art relates to casein, it is thus equally applicable to soya protein.

This invention relates to the use of ammonium zirconyl carbonate to impart a superior degree of water resistance to protein compositions and films as well as to pigmented protein combinations and eliminates all of the above-mentioned limitations.

Ammonium zirconyl carbonate is commercially available and can be easily prepared. As described by Ogawa,[1] ammonium zirconyl carbonate can be prepared by reacting zirconyl chloride with an excess of ammonium bicarbonate at a pH of 6.5 to 7.0. Also (as described by Van Mater in United States Patent No. 2,457,853, ammonium zirconyl carbonate can be prepared by reaction of zirconyl sulfate with ammonium carbonate. Thus it can be seen that ammonium zirconyl carbonate, $(NH_4)_2ZrO(CO_3)_2$, is a wholly inorganic polyvalent

[1] Osaka Furitsu Kôgyô-Shoreikan Hôkoku, 19: 67–70 (1958).

metal ion compound of known molecular constitution that is prepared commercially from readily available, inexpensive starting materials all of which are of an inorganic nature.

Throughout the experimental work described herein a commercially available solution containing approximately 20% by weight of ammonium zirconyl carbonate was employed. This solution generally had a pH of about 7.8, and when combined with the protein adhesive and pigments its pH was between about 7.5 and 9.0.

The following examples further illustrate the invention and set forth a number of ways in which the invention can be advantageously practiced.

*Example I*

Step 1.—13 units of casein were wetted thoroughly with 63 units of water and the temperature of the mixture brought to 50° C. This wetted casein was then mixed with 1.6 units of 28% ammonia water and agitated until the starting protein was colloidally dispersed.

Step 2.—100 units of a fine particle domestic coating clay were then dispersed with a propeller-type agitator in 100 units of water in which there had previously been dissolved 0.3 unit of diammonium acid phosphate dispersing agent.

Step 3.—To the pigment dispersion of Step 2 there was added gradually the colloidal casein dispersion of Step 1 under slow agitation with a propeller-type agitator. Also there were added 0.5 unit of n-butanol, a foam-dispersing agent, and 37 units of water to provide a completed coating composition. The final percent solids of the composition was calculated to be 36%. This coating was designated as the blank.

Step 4.—This typical low-solids coating composition was then applied, via Mayer rod, to two coating raw stocks, namely, a 47 lb. per ream (TAPPI 25" x 38"/500) machine coating base and to a 200 lb./ream book-lined cylinder board, both bases being coated with sufficient wet coating to yield added dry coating weights of 12 lbs. per ream, air dry basis.

Step 5.—One set of the blank sheets was allowed to age at room temperature while specimens of another duplicate set were given an accelerated cure by heating an oven at 200° F. for periods of 1, 2, 3, and 4 minutes, respectively.

The sheet specimens which had been air-dried only for a period of 14 days were evaluated for degree of insolubility by the standard TAPPI wet-rub test and found to rate poor.

The sheet specimens which had been given an accelerated heat aging were also found to rate poor.

*Example II*

The procedure described in the foregoing Example I was repeated twice excepting only that to the first so-prepared blank coating there were added, with agitation, 6 units of a 20% solution of ammonium zirconyl carbonate, and to the second so-prepared blank coating there were added similarly 3 units of a 20% solution of ammonium zirconyl carbonate. Thus the first coating composition contained slightly less than 10% by weight of the ammonium zirconyl carbonate insolubilizing agent based upon the dry weight of casein present, while the second coating composition contained slightly less than 5% by weight of the ammonium zirconyl carbonate insolubilizing agent based upon the dry weight of the casein present.

Wet-rub tests performed upon the base stocks coated in the same manner as set forth in Example I with the two coating compositions just described exhibited a superior degree of insolubilization after only 1 minute of accelerated curing at 200° F. Even more important, duplicate specimens which had been allowed to air-dry at room temperature only for 1 day also exhibited a superior degree of insolubilization, thus indicating the speed of reaction even in the absence of artificially induced curing conditions.

*Example III*

The procedure described in the foregoing Example I was repeated excepting only that the 13 units of casein were replaced by 13 units of soya protein to constitute a new blank coating based upon soya protein as the sole adhesive. The wet-rub tests performed upon the base stocks coated as in Example I were found to yield uniformly poor ratings, regardless of the manner of curing by air-drying or oven-drying for periods of up to 4 minutes at 200° F.

Consequently, four new coatings were prepared into which successively increasing amounts of 20% ammonium zirconyl carbonate solution were incorporated, based upon the 13 units of dry soya protein present as adhesive, as indicated in the following table.

| Coating No. | Amt. Ammonium Zirconyl Carbonate Solution Added, units | Dry Wt. Ammonium Zirconyl Carbonate Added, unit | Percent Added Based on Adhesive | Degree of Insolubilization |
|---|---|---|---|---|
| Blank | None | None | None | Poor. |
| 1 | 2 | 0.4 | 3.1 | Good. |
| 2 | 4 | 0.8 | 6.2 | Excellent. |
| 3 | 6 | 1.2 | 9.3 | Do. |
| 4 | 8 | 1.6 | 12.4 | Do. |

As is well known by those practiced in the art of coating of paper and paperboard, soya protein is more difficult to insolubilize than is casein under the same conditinos of treatment. Yet, as the ratings in the above table indicate, excellent results were achieved at the 6.2% level of addition of ammonium zirconyl carbonate. In fact, for most purposes, the degree of insolubilization achieved at the 3.1% level of addition would be very acceptable.

The following examples, 4 and 5, illustrate the advantageous employment of the new insolubilizing agent in a high solids coating composition suitable for on-the-machine coating operations.

*Example IV*

Step 1.—16 units of a typical soya protein were wetted with 64 units of water and the temperature brought to 50° C. The wetted protein was then mixed with 1.92 units of 28% ammonia water until the protein was colloidally dispersed, after which 2.4 units of dicyandiamide were charged to the dispersion and mixed until complete solution of the viscosity reductant had taken place, resulting in a thinning of the protein dispersion.

Step 2.—100 units of a fine particle coating clay, bearing no previously applied dispersing agent, were then mixed step-wise in a heavy-duty mixer with the dispersion of Step 1 and also with a solution of 0.3 unit of diammonium acid phosphate in 14.3 units of water to provide a thick mixture or mass.

Step 3.—To the mixture of Step 2 there were added 6.3 units of a commercial aqueous synthetic latex containing 3.0 dry units of styrene-butadiene copolymer as additional, non-proteinaceous adhesive and the whole coating composition mixed additionally for a period of 5 minutes in the heavy-duty mixer before being discharged therefrom to yield a smooth, homogeneous coating composition containing actual solids of 59.1%, as determined.

Step 4.—The blank coating composition of Step 3 was then applied to the raw stock of Example I in the manner described therein and given the same degree of curing, both air-dried and heat-dried.

A wet-rub rating of fair was determined for this blank coating thus applied and cured.

*Example V*

The procedure described in the foregoing Example IV was repeated excepting only that just prior to the addition of the latex dispersion in Step 3 there were added 6 units of a 20% solution of ammonium zirconyl carbonate containing 1.2 dry units.

The final coating composition was found, by determination, to contain 58.8% actual solids.

The coated specimens produced by application of this coating composition to the raw stock of Example I and in the manner described therein gave wet-rub ratings of excellent, both for the samples cured for 4 minutes at 200° F. and for the samples air-dried, only, for 14 days.

Also, of great importance to the proper performance of this typical high-solids, on-the-machine coating composition, a rheogram determination on a Hi-Shear Viscometer for this composition proved to be substantially identical to a rheogram similarly performed upon the blank coating of Example IV.

The foregoing examples illustrate the utility of my invention in achieving excellent to superior degrees of insolubilization of casein and soya protein films and coating compositions by suitable employment of a single, wholly inorganic salt.

My invention is of further usefulness in the process of making drum-finished coated paper. This well-known process, as described by Bradner in United States Patent No. 1,719,166, comprises pressing the wet, coated surface of a paper web into intimate contact with a hot, polished surface, usually a chromium plate drum, until the coated surface is dry enough to release itself. Such coated paper is designated "cast-coated" paper and has been the subject of much developmental effort in the last decade.

Most cast-coating processes depend on the presence of oleaginous materials in the coating composition to provide a very thin oily film at the casting surface to effect a clean release of the paper from the surface. However, my invention obviates this type of mechanism entirely in that instead of causing the casting surface to become non-adhesive to the coating, at the time of release, the coating is caused to become non-adhesive to the drum surface, at the time of release, which can be when the coating is dry or still wet. In this way the ammonium zirconyl carbonate acts not only as a protein insolubilizer but as a release agent as well.

Example VI

The first-described coating composition of Example II, namely, that containing 100 units of coating clay, 13 units of casein, and 1.2 dry units of ammonium zirconyl carbonate, was applied to a 47 lb. per ream raw stock in sufficient amount to yield an added dry coating weight of 15 lbs. per ream and the so-coated sheet dried in the conventional manner. After drying the coated paper was supercalendered and then the insolubilized coated surface remoistened either by steaming or by running it through a water bath and subsequently through a rubber squeeze-roll nip to remove excess entrained water.

The so-moistened but insolubilized and relatively non-adhesive coated surface was then roll-pressed into intimate physical contact with a hot chromium plated surface, the temperature of which was about 100° C. After drying was completed the sheet peeled itself cleanly and easily from the casting surface to produce a glossy, cast-coated surface substantially free of defects, remarkably resistant to water, and suitable for printing of the highest fidelity.

Example VII

The procedure of Example VI was repeated but with the following variations. The coating composition of Example I containing no ammonium zirconyl carbonate was employed. The dried, supercalendered coated sheet was then run through a bath containing, variously, 5% to 20% of ammonium zirconyl carbonate in aqueous solution, and the so-wetted sheet passed through a nip formed by a pair of rubber squeeze rolls to reject excess entrained solution before roll-pressing the coated surface into intimate physical contact with a hot chromium plated surface. After drying was completed the sheet peeled itself cleanly and easily from the casting surface to produce a glossy, cast-coated surface substantially free of defects, very resistant to the action of water, and suitable for high quality printing purposes.

In both Examples VI and VII the step of supercalendering may be omitted, if desired, but in such event it is more difficult to produce a cast surface free of defects.

Example VIII

The coating composition of Example IV was prepared but with the exception that 16 units of casein were substituted in place of 16 units of soya protein. The solids content of this high-solids coating composition, typical of those employed in an on-the-machine coating opertion, was determined to be 59.2%.

The coating composition was then applied via a multiple roll coater of the train type to a 47 lb. per ream well-formed raw stock at a wet coating weight of 20 lbs. per ream (approximately 12 lbs. per ream, air-dried basis).

The freshly-coated stock was then immersed in a bath containing, variously, from 10% to 20% of ammonium zirconyl carbonate in water solution, after which it was passed through a nip formed by a pair of rotating rubber squeeze rolls to reject excess entrained liquid solution. The now insolubilized and relatively non-adhesive coated surface was then roll pressed into intimate contact with a hot, polished chromium plated surface and allowed to dry, producing a typical cast-coated surface substantially free of defects, very resistant to the action of water, and eminently suitable for printing of the highest fidelity.

Optionally, auxiliary drying means may be interposed between the squeeze roll nip and the finishing surface.

Example IX

The procedure of Example VIII was repeated exactly excepting only that prior to complete drying of the coated assembly that had been roll pressed into intimate contact with the heated, polished chromium plated finishing surface the coated assembly was forcibly pulled away from said finishing surface while the coating was still wet and the remaining moisture removed by conventional drying means. This undensified dry coated paper exhibited a very flat and level surface which was not a mirror-image of the finishing surface but instead had the appearance of a high-grade supercalendered paper. The wet-rub resistance was excellent and the paper exhibited excellent printing properties, both for the letterpress and offset processes.

The degree of gloss attained may be varied at will by regulation of the point and time at which the coated sheet is pulled away from the highly polished finishing surface. For example, if drying is allowed to proceed to completion where autogenetic release of the coated surface from the finishing surface occurs, a glossy cast-coated paper will be produced. On the other hand, if the coated paper is separated forcibly, as by a take-off roll, while still wet, any degree of gloss may be produced ranging from a matte finish to a fairly glossy finish, depending on the residual moisture content of the coating at the particular point of forcible separation. Without the use of ammonium zirconyl carbonate as described in Examples VI through IX, inclusive, a condition of very bad sticking of the coated surface to the finishing surface would have resulted, and the process would have been inoperable.

For those who wish to practice the invention using a so-called low-solids coating composition and without intermediate supercalendering, the following example will serve as a guide.

Example X

A coating composition containing 90 units of fine particle size coating clay, 10 units of fine particle size calcium carbonate pigment, 13 units of casein, 3 units of butadiene-styrene synthetic latex, and 1.2 units of ammonium zirconyl carbonate, all on a dry basis, was coated at 36% solids by an air-knife coater upon a 47 lb. per ream (25" x 38"/500) raw stock in an amount sufficient to deposit 15 lbs. per ream of dry coating.

The freshly coated stock was then immersed in a bath containing, variously, from 5% to 20% of ammonium zirconyl carbonate in aqueous solution which caused the coated surface to become relatively non-adhesive, after which it was passed through a nip formed by a pair of rotating rubber squeeze rolls to reject excess entrained insolubilizing solution. The resulting non-sticky wet coated surface was then roll-pressed into intimate contact with a heated, polished chromium plated surface at about 100° C. and allowed to dry, producing a typical cast-coated surface substantially free of defects, very resistant to the action of water, and exceptionally suitable for printing of the highest fidelity.

As explained in Example IX, forcible removal of the coated sheet prior to complete drying thereof could have been employed had it been desired to produce a high-quality, undensified coated sheet, the gloss of which would have been less than that associated with true cast-coated surfaces. Optionally, extra drying means may be interposed between the coating mechanism and the squeeze roll nip or between the squeeze roll nip and the finishing surface, or both, if desired.

Another area in which my invention may find wide utility is that in which casein adhesives, or glues, are employed. As these adhesives are presently employed, it has sometimes been necessary to increase their water resistance by the inclusion of certain resinous formaldehyde donors which cross link with the amino and imido nitrogen groups of the casein molecule. Unfortunately, many of these insolubilizers cause undesirable increases in the viscosity of the adhesive in a relatively short time so that the workable pot life of such a combination is usually limited to a period of several hours. This is particularly true in cases where a catalyst is used in combination with the insolubilizing resins to hasten the desired reaction.

The applicability of my invention to the area of casein glues can be readily appreciated when it is considered that no large increase in viscosity is encountered, a pot life of several days is realized, and the resulting casein adhesive film is highly water resistant.

As an aid in demonstrating the water resistance of the modified protein adhesive film, the following experiment was carried out. An ammoniacal solution of casein was prepared by dissolving casein in the usual manner so that the solids content of the collidally dispersed protein was 16⅔%. This dispersion was divided into two equal parts. To one part there was added, with moderate agitation, sufficient ammonium zirconyl carbonate solution so that the final adhesive composition contained 20% by weight of dry ammonium zirconyl carbonate based on the dry weight of the casein contained therein. The percent solids of this modified adhesive dispersion was 17.1%.

Next, clear films of the original unmodified casein adhesive and the casein adhesive modified by the addition of ammonium zirconyl carbonate were cast on microscope slides. After allowing the films to air-dry at room temperature and stand for a period of 4 hours, the slides were immersed in beakers containing clear water and observed to determine their degree of water resistance. The films resulting from the unmodified casein adhesive soon lost their integrity and in a period of 30 minutes had entirely dissolved. The films cast from the casein adhesive containing ammonium zirconyl carbonate not only retained their integrity but exhibited no evidence whatsoever of being affected by water.

A practical example of the utility of my invention in the field of water-resistant laminates follows.

*Example XI*

Both of the adhesive compositions described above were applied in a thin film by means of a rubber squeeze-roll nip to one side of a four-ply, book-lined cylinder board of approximately 200 lbs. per ream (25" x 38"/500), after which each specimen so treated was brought into contact at the wet film surface with another specimen of the dry board and the assembly laminated together by passage through a laminating nip.

After drying for 2 minutes in an oven at 200° F., the laminated specimens were allowed to stand at room temperature for 1 day, after which the specimens laminated with the unmodified protein and the modified protein were both immersed in cold water for a period of 24 hours. At the end of this period the specimens were removed from the cold water and while still soaking wet pulled apart. In every instance the laminated assemblies which had employed the untreated protein as the adhesive, pulled apart principally at the adhesive line, indicating the lack of resistance of this film to the deleterious action of water. Quite in contrast, the laminated assemblies containing the same protein as adhesive but which had been modified with ammonium zirconyl carbonate prior to its application gave no failure at the adhesive line under forced separation while wet, but rather the failure occurred uniformly within the fibers themselves, thus indicating the superior water-resistant properties of such a composition when employed in a laminating operation.

It will be obvious to those skilled in the art that by proper adjustment of the concentration of reactants to suit the viscosity-time-pressure requirements of the particular laminating process many efficacious formulations may be devised to which the employment of ammonium zirconyl carbonate may be adapted. Therefore, I do not wish to be limited to the particular descriptions provided in the examples.

Various other materials can be incorporated into the coating compositions of my invention including other adhesives or binders in addition to the proteins disclosed herein which are compatible in the coatings such as styrene-butadiene latices.

Various pigments can also be used including clay, calcium carbonate, titanium dioxide, blanc fixe, and satin white. The concentration can be varied widely and can conform to the standard practices of the coating industry.

Either casein, soya protein, or mixtures thereof can be used alternatively in the above examples according to this invention as will be apparent to those skilled in the art.

The amount of ammonium zirconyl carbonate which can be used can be varied quite widely and will depend mainly upon the insolubilization or release characteristics desired in the final coating or demanded by the particular application planned for the resultant coated product. The amount will also vary depending upon whether or not casein, soya protein, or mixtures thereof are used as an adhesive and the amounts of casein soya protein, or mixtures thereof used in the coating composition. The presence of minor amounts of other adhesives such as styrene-butadiene latices will also have an effect on the amount used. The most advantageous amount of ammonium zirconyl carbonate which can be employed according to this invention can be readily determined by routine experimentation by those skilled in the art. These facts make it impractical to set forth any specific minimum or maximum amount of ammonium zirconyl carbonate which can be used. Sufficient ammonium zirconyl carbonate should be used to give the desired insolubility and release characteristics. The maximum amount of ammonium zirconyl carbonate which could be employed will mainy depend upon the economic situation as well as the variables set forth above. The use of increased amounts of ammonium zirconyl carbonate, although generally resulting in increased insolubility, does not appear to affect the desirable properties of the coating composition but after a certain point merely results in increased costs. The ammonium zirconyl carbonate should not of course be used in amounts sufficiently large to adversely affect the advantageous properties of the protein adhesive compositions.

Various other additives can also be used such as minor amounts of other adhesives, defoamers, dyes, and other standard additives without altering the intent of the mechanism of this invention, and various instances of the use of such additives are set forth in the examples for purposes of illustration.

The coating compositions of this invention can be treated to improve the properties of the resulting dried coating by finishing rolls or calendering, generally, and said treatment need not be limited to the cast-coating treatment described above and set forth in some of the specific working examples. The coatings can be contacted either in the wet or dry state with various types of finishing rolls such as calendering and cast-coating finishing rolls. The particular type of finishing or calendering treatment applied will depend mainly upon the properties desired in the final dried coating.

Formic acid can be advantageously used in conjunction with the protein ammonium zirconyl carbonate modified coating compositions of this invention to increase the rate of the insolubilization reaction and to promote the release of the coatings from the finishing or calendering rolls. One advantageous manner of using the formic acid to increase the rate of insolubilization and release is to contact coated sheets containing the ammonium zirconyl carbonate modified protein adhesive with a dilute aqueous solution of the formic acid prior to completion of the insolubilization reaction. Formic acid is incompatible, or reacts, with ammonium zirconyl carbonate in aqueous solutions and therefore cannot be used to promote the insolubilization reaction in the coating compositions. The formic acid therefore should be applied to the coated product before the insolubilization reaction has been completed. Even when applying a dilute solution of formic acid to a coating containing ammonium zirconyl carbonate and protein adhesive, care must be exercised to avoid premature reaction with ammonium zirconyl carbonate. Such a reaction can be avoided by partially drying the coating before applying the formic acid. This is particularly true with respect to coating compositions having low solids content. The reaction is not significantly apparent when formic acid is applied to products having high solids content compositions applied thereto. With such high solids coatings, a dilute solution of formic acid can be applied directly to the freshly-coated product. The conditions under which formic acid can be used to promote the insolubilization reaction will vary depending on a number of factors including the solids content of the particular composition applied, the amount of ammonium zirconyl carbonate and formic acid used, and so forth. The most advantageous conditions for application of the formic acid can be determined by routine experimentation, as will be apparent to those skilled in the art. The amount of formic acid can also be varied quite widely depending upon the particular composition being treated and the speed of reaction desired. The most advantageous amount of formic acid can also be determined by routine experimentation by those skilled in the art depending upon the particular facts involved.

I claim:

1. A composition of matter comprising a protein adhesive and ammonium zirconyl carbonate.

2. The composition of matter of claim 1 containing an inorganic pigment.

3. A composition of matter comprising an aqueous solution of a protein adhesive and a sufficient amount of ammonium zirconyl carbonate to render the composition substantially insoluble in water when dry.

4. A composition of matter comprising an aqueous solution of a protein adhesive, an inorganic pigment, and a sufficient amount of ammonium zirconyl carbonate to render the composition substantially insoluble in water when dry.

5. An article of manufacture comprising a paper base having adhered thereto a water soluble protein adhesive which is insolubilized by drying the coating in the presence of ammonium zirconyl carbonate.

6. The article of manufacture of claim 5 containing an inorganic pigment.

7. The process of preparing water-resistant, water-insoluble coated paper and coated paperboard which comprises applying to the base surface to be coated an aqueous dispersion of a protein adhesive and ammonium zirconyl carbonate to form a coating thereon and drying said coating to render the coating substantially water insoluble.

8. The process of claim 7 in which the coating composition also contains an inorganic pigment.

9. The process of producing cast-coated paper having a high gloss which comprises applying to a base paper surface an aqueous dispersion of a protein adhesive, inorganic pigment and ammonium zirconyl carbonate to form a coating thereon, contacting the wet coating with a heated finishing roll, and maintaining said contact for a sufficient length of time to dry the coating, render it substantially water insoluble, and produce a high gloss finish.

10. The process of preparing a water-resistant, water-insoluble coated paper which comprises applying to a base paper surface an aqueous dispersion of a protein adhesive, inorganic pigment and ammonium zirconyl carbonate to form a coating thereon, contacting the wet coated paper with a heated finishing roll, maintaining said contact for a sufficient length of time to only partially dry said coating, removing the partially-dried coating from the finishing roll, and completing the drying of the coating in the absence of contact with a finishing roll.

11. The process of preparing water-resistant, water-insoluble coated paper and coated paperboard which comprises applying to a base paper surface an aqueous dispersion of a protein adhesive, inorganic pigment and ammonium zirconyl carbonate to form a coating thereon and contacting said coating with a dilute solution of formic acid prior to completion of the insolubilization reaction to accelerate the water insolubilization reaction.

12. The process of preparing water-resistant, water-insoluble coated paper which comprises applying to the surface of the paper to be coated an aqueous dispersion of a protein adhesive to form a coating thereon, applying to said coating an aqueous solution of ammonium zirconyl carbonate, and drying the coating.

13. The process of claim 12 in which the coating composition also contains a pigment.

14. The process of claim 12 in which a cast-coated paper having a high gloss is produced by contacting the paper after it has been moistened by the aqueous solution of ammonium zirconyl carbonate with a heated finishing roll and maintaining said contact for a sufficient length of time to dry the coating, render it substantially water insoluble, and produce a high gloss finish.

15. The process of claim 12 in which coated paper is produced by contacting the paper after it has been moistened with the aqueous solution of ammonium zirconyl carbonate with a heated finishing roll for a time sufficient to only partially dry said coating, removing the partially-dried coating from the finishing roll, and subsequently completing the drying of the coating in the absence of contact with the finishing roll.

16. The process of preparing laminates which comprises applying to one surface of the material to be laminated an aqueous dispersion of a proteinaceous material containing ammonium zirconyl carbonate to form a coating thereon, bringing an uncoated material into contact at the wet film interface with the coated material, laminating said assembly by passing it through a laminating nip, and drying the laminate to form a substantially water-insoluble adhesive bond.

17. The process of claim 16 in which the aqueous dispersion also contains an inorganic pigment.

(References on following page)

References Cited by the Examiner

UNITED STATES PATENTS

| | | | |
|---|---|---|---|
| 2,457,853 | 1/1949 | Van Meater | 117—143 |
| 2,482,816 | 9/1949 | Van Mater | 117—167 |
| 2,567,184 | 9/1951 | Corwin et al. | 260—113 X |
| 2,641,558 | 6/1953 | Urban et al. | 117—154 |
| 2,758,102 | 8/1956 | Grummitt et al. | 260—29.6 |
| 2,849,334 | 8/1958 | Hart | 260—113 X |
| 2,932,598 | 4/1960 | Henning | 117—126 |
| 3,081,199 | 3/1963 | Taylor | 117—156 |

JOSEPH B. SPENCER, *Primary Examiner.*

RICHARD E. NEVIUS, *Examiner.*